United States Patent [19]
Clarke et al.

[11] Patent Number: 5,952,075
[45] Date of Patent: Sep. 14, 1999

[54] NEEDLED NEAR NETSHAPE CARBON PREFORMS HAVING POLAR WOVEN SUBSTRATES AND METHODS OF PRODUCING SAME

[75] Inventors: Steven Clarke, Mansfield, Mass.; Dominique Ponsolle, Winona, Minn.

[73] Assignee: Fiberite, Inc., Tempe, Ariz.

[21] Appl. No.: 08/924,907

[22] Filed: Sep. 8, 1997

[51] Int. Cl.$^6$ ............................................ B32B 3/02
[52] U.S. Cl. .................... 428/66.2; 428/222; 28/107; 28/110
[58] Field of Search .................. 428/66.2, 222; 28/107, 110

[56] References Cited

U.S. PATENT DOCUMENTS

| | | | |
|---|---|---|---|
| 5,228,175 | 7/1993 | Olry et al. | 28/168 |
| 5,392,500 | 2/1995 | Olry et al. | 28/168 |
| 5,456,981 | 10/1995 | Olry et al. | 428/359 |
| 5,546,880 | 8/1996 | Ronyak et al. | 112/475.01 |
| 5,687,634 | 11/1997 | Ransone | 92/170.1 |

*Primary Examiner*—Christopher Raimund
*Attorney, Agent, or Firm*—Gray, Cary, Ware & Freidenrich, LLP; Stephen E. Reiter; David F. Kleinsmith

[57] ABSTRACT

A near netshape carbon preform is provided comprising a woven fabric of a plurality of carbon yarns, said woven fabric having a helical shape and an adjustable fiber orientation distribution, said woven fabric being laid down, turn by turn, into a near net shape preform, and each layer of said fabric being needled to produce a near net shape preform with increased interlaminar strength and an adjustable fiber orientation distribution. A method for manufacturing a near net shape carbon preform with a polar woven substrate is also disclosed.

23 Claims, 4 Drawing Sheets

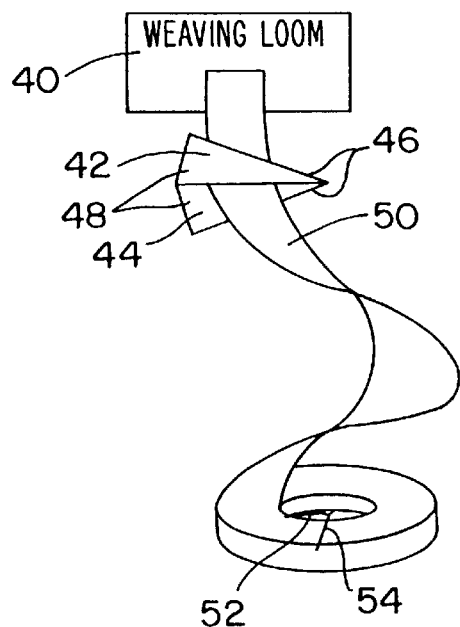
FIG. 2
FIG. 3B
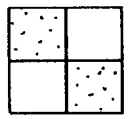   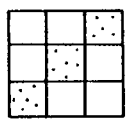   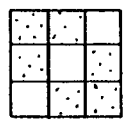   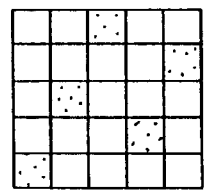   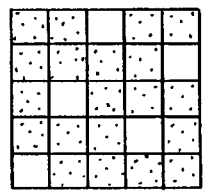
FIG. 3A            FIG. 3C     FIG. 3D   FIG. 3E

NEEDLED NEAR NETSHAPE CARBON PREFORMS HAVING POLAR WOVEN SUBSTRATES AND METHODS OF PRODUCING SAME

BACKGROUND OF THE INVENTION

This invention relates generally to carbon substrates and methods for producing preforms using the substrates, and in particular, to a needled polar woven fabric substrate and method for producing a carbon preform using the substrate for friction disk applications.

A brake disc for an aircraft or an automobile requires a material having high thermo-mechanical resistance and long wear. For some applications, asbestos is used due to its heat resistance properties. In addition to asbestos, carbon may also be used because of its good heat resistant properties, although conventional carbon brake products are expensive and historically have been restricted to aerospace or automotive racing applications.

Generally, a substrate of carbon fiber or a carbon precursor may be used to produce a conventional carbon/carbon part with sufficiently high heat resistance values for use in, for example, an aircraft braking system. These conventional parts require a complicated time consuming process to produce a part with sufficient carbon to provide the necessary high temperature characteristics. These conventional carbon/carbon parts are expensive due to the complicated manufacturing process. There are a number of different types of substrates used to make conventional carbon parts including discontinuous carbon fiber molding compound, non-woven air lay carbon fiber substrates, woven carbon fiber substrates, or braided carbon fiber substrates.

To produce a conventional carbon part from a carbon fiber substrate, a plurality of carbon fiber precursors, such as polyacrylonitrile (PAN) fibrous layers, are used. These substrates are sheets of material that must be cut into a particular shape, such as a disk for a brake, which wastes a portion of the substrate because the substrate is generally not recyclable. These substrates may be stacked on top of each other to a desired thickness and then the stacked substrates may be needle-punched together to join or consolidate the substrates to each other by intermingling carbon fibers between the layers of the substrates. This consolidation of the substrates creates a preform. The preform may then be batch carbonized, in which the preform is placed in an oven at 800 to 1100 degrees Celsius, to char the fiber of the substrate and increase the carbon content of the preform. These preforms may then have additional carbon atoms deposited on the carbon fibers of the preforms by using a chemical vapor infiltration (CVI) process. In the CVI process, the preform is placed in a chamber, the air in the chamber is removed, and a carbon bearing gas, such as methane, is introduced into the chamber which when subjected to temperature releases carbon atoms that settle/infiltrate into the preform. The CVI process may increase the carbon content and density of the preform. The preform may then be heat treated to reorient the carbon atoms to a more energetically favorable configuration to improve, for example, physical properties, machined, and treated with an anti-oxidant to form the finished carbon part.

The conventional preform process, as described above, and the conventional carbon parts have several problems. The batch carbonization process is slow and time consuming, taking hours or days which increases the cost of the part. There is also the added cost of the furnaces necessary to perform the carbonization step because these furnaces cannot be used for any other purpose. In addition, any material removed from the preform during the die cutting and shaping processes cannot generally be re-used because there is no appropriate method for recycling this scrap material back into the preform manufacturing process. Thus, due to the above problems, the conventional preforms produce a carbon part that is typically too expensive to use for most commercial applications.

Braiding is another conventional method which attempted to reduce the waste material associated with each preform. A tubular braid of textile may be collapsed to form a flat tape and the flat tape may be helically wound to form a disk preform with reduced waste since the disk is not cut out from a sheet substrate. The distribution of the fibers is not homogeneous in the preform using this method.

Another conventional substrate uses carbon fibers that are impregnated with a suitable binder and then the impregnated substrate may be compressed under heat and pressure to form the near net shape preform. The preform is then batch carbonized to char the binder via condensation of the binder into carbon. The binder may be liquid furfuryl alcohol polymer catalyzed with maleic anhydride. Once again, this substrate requires a batch carbonization process step in order to char the binder. Still another substrate for a carbon part uses carbon fibers, that may be oxidized polyacrylonitrile (PAN) fibers that may then be carbonized to form the carbon preform that may be subjected to the chemical vapor infiltration (CVI) process. This substrate also requires a carbonization step.

These conventional materials for producing carbon parts require a batch carbonization step, which is slow, increases the cost of the final part and requires an expensive carbonization furnace. None of the conventional materials provide a uniform, homogeneous, controllable fiber orientation distribution over an entire preform. The conventional preforms also waste substrate material which increases the cost of the preform. Due to these deficiencies, conventional preforms produce carbon parts that are too expensive to be used in most conventional commercial applications and do not provide sufficiently uniform fiber distribution.

Thus, there is a need for a preform manufactured from a polar woven substrate and a method for producing carbon preforms using a substrate which avoids these and other problems of the known substrates, processes and carbon preforms, and it is to this end that the present invention is directed.

SUMMARY OF THE INVENTION

The invention provides a preform manufactured with a polar woven substrate that permits a near net shape carbon preform to be manufactured which provides several advantages. The substrate material normally associated with trimming of a preform into a disk shape may be reduced by producing a near net shape polar weave substrate that does not require trimming. In addition, the use of carbon fibers to form the preform eliminates the time consuming and expensive carbonization step. The polar woven substrate has a fiber orientation and placement which when combined with appropriate needling parameters produces a homogeneous preform having uniform fiber distribution throughout the preform that may be utilized for friction disk applications, such as aircraft brakes.

The invention further provides a polar woven substrate having a pair of perpendicularly oriented carbon yarns that may be woven together. A plurality of carbon fibers may be intertwined with the yarns such that a fabric with intertwined carbon fibers may be produced. The fabric may be polar woven such that the fabric may have a helical shape and a near net shape disk preform may be produced by laying down layers of the helical polar woven fabric. Different weave patterns may be used depending on the desired characteristics of the preform. In addition, different gradients of the yarns may be constructed within the fabric and the preform which uniformly distributes fibers throughout the volume of the preform to form a homogenous preform. The polar woven fabric may be wound into a disk shaped preform that may be needled to increase the preform cohesion, the interlaminar strength of the composite and the preform densification. The parameters of the needling may be adjusted to change the characteristics of the preform and hence the composite properties.

Thus, in accordance with the invention, a near netshape carbon preform is provided comprising a woven fabric of a plurality of carbon yarns, said woven fabric having a helical shape and an adjustable fiber orientation distribution, said woven fabric being laid down, turn by turn, into a near net shape preform, and each layer of said fabric being needled to produce a near net shape preform with an adjustable fiber orientation distribution. A method for manufacturing a near net shape carbon preform with a polar woven substrate is also disclosed.

BRIEF DESCRIPTION OF THE DRAWINGS

FIG. 2 is a diagram of a process for manufacturing a polar woven substrate in accordance with the invention;

FIG. 3A illustrates a basic weaving pattern;

FIGS. 3B and 3C illustrate a twill weaving pattern as seen from opposite sides of the fabric;

FIGS. 3D and 3E illustrate a satin weaving pattern as seen from opposite sides of the fabric;

DETAILED DESCRIPTION OF THE PREFERRED EMBODIMENT

The invention is particularly applicable to using a polar woven substrate to produce carbon preforms for friction disk applications. It is in this context that the invention will be described. It will be appreciated, however, that the substrate, preform and method in accordance with the invention has greater utility.

Figure 1:
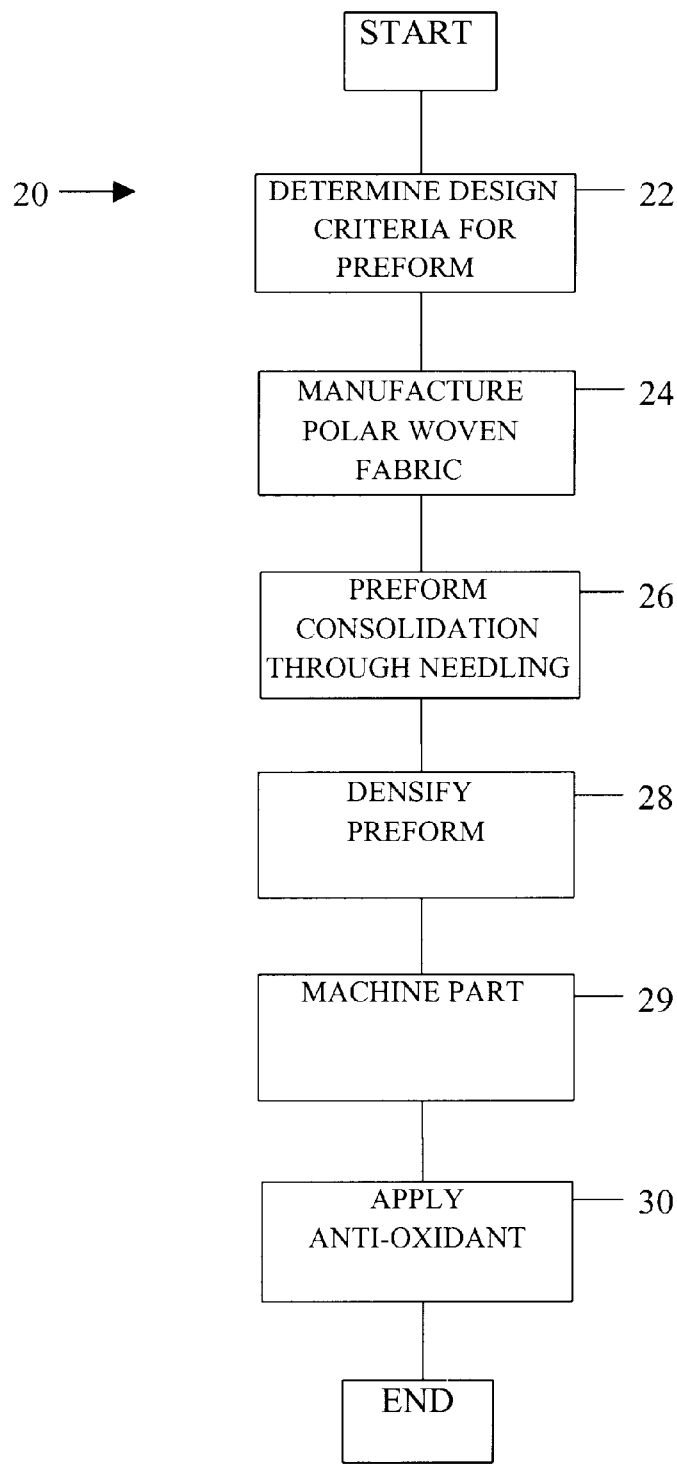
FIG. 1 is a flowchart illustrating a method for producing a near net shape carbon part using a polar woven substrate in accordance with the invention.

FIG. 1 is a flowchart of a method 20 for manufacturing a carbon preform using a polar woven carbon fiber substrate in accordance with the invention. First, various design criteria for a particular preform to be manufactured may be determined in step 22 and the appropriate criteria and parameters for the various steps of the process may be selected to meet the design criteria. For example, the characteristics of the polar woven preform may be modified, as described below, to produce a preform with slightly different characteristics, the needling parameters may be modified, or the yarn selected to form the polar woven fabric may be modified. Next, in step 24, the polar woven substrate may be manufactured, as described below with references to FIGS. 2–6.

The polar woven substrates may be formed of a carbon fiber such that carbonization of the actual preform may not be required because the carbon fibers have already previously been carbonized. The polar woven substrate may comprise a plurality of carbon fibers, carbon fiber precursors, such as PAN fibers, ceramic fibers, or carbonized carbon fibers having various grades depending on the degree of carbonization of the carbon fibers. Several different types of carbon yarns, containing carbon fibers, may be used to produce a polar woven preform in accordance with the invention. A first carbon yarn comprises a continuous carbon filament with a slight twist in which the carbon filaments are substantially parallel to each other. Another carbon yarn comprises a plurality of discontinuous fibers. The discontinuous fibers may be formed by stretching and breaking continuous filaments into pieces of carbon and the piece of carbon are held together by a fugitive material, but may be removed from the preform by the application of heat. The fugitive material may be polyvinyl alcohol (PVA), polypropylene or polyester. These carbon yarns may then by woven together, as described below, to form a polar woven fabric that may be used to form a polar woven near netshape preform. The fugitive material may be removed during the CVI densification step.

Once the near netshape polar woven substrate has been manufactured, in step 26, the polar woven substrate may be helically laid down to form a near net shape disk of a desired thickness and the layers of the polar woven fabric may then be consolidated in several different manners by a needling process as described below with reference to FIGS. 7 and 8. The needling process may reorient some of the fibers from a particular layer through to another layer so that some of the fibers within and between the layers become reoriented in the Z plane direction and intermingle with some fibers from another layer. This intermingling of the fibers of the stacked layers of the substrate increase the interlaminar strength of the composite. The consolidated preform may then be densified to produce a densified part, in step 28, in which carbon atoms may be added to fill in the free volume between carbon fibers of the preform resulting in increased part density. Generally, to add the carbon atoms, a chemical vapor infiltration (CVI) process is used in which the preforms is placed in a heated chamber, the air in the chamber is removed, and a carbon containing gas, such as methane, is introduced into the chamber so that the carbon atoms from the methane may be deposited on and impregnate the preform. The densified preform may also be machined in step 29. Finally, in step 30, an anti-oxidant layer may be added to the exposed surfaces of the densified part. The anti-oxidant layer is designed to prevent surface oxidation of the carbon part. Now, a method of manufacturing a polar woven fabric substrate for use in a near netshape carbon preform in accordance with the invention will be described.

FIG. 2 is a diagram of a process for manufacturing a polar woven substrate in accordance with the invention. As described above, two sets of perpendicularly oriented carbon yarns, known as the warp and the weft are woven together using a conventional weaving process, as described above, using a conventional weaving loom 40. Both types of carbon yarns, having continuous and discontinuous fibers, may be used in accordance with the invention to produce the polar woven fabric. A pair of conical rollers 42, 44 may be the take-up device of the weaving loom. The rollers may induce a curvature to the fabric due to the difference in the take-up speed between a head 46 and a base 48 of each rollers. The difference between the speed of the head and base of each roller causes the resulting fabric 50 to have a flat helicoidal shape. An inside diameter 52 and an outside diameter 54 of the resulting fabric are determined by the geometric dimensions of the rollers 42, 44 and the locations of the fabric within the rollers. The inner diameter of the helicoidal shaped fabric may be formed by the head of the rollers whereas the outer diameter may be formed by the base of the rollers. The fabric warp yarn may be oriented to run along the length of the spiral whereas the weft or fill yarn may be oriented to be in a plane perpendicular to the spiral axis. Thus, the warp yarns are circumferentially oriented and the weft yarns are radially oriented such that the warp yarns and the weft yarns are perpendicular at their cross-over points. This distributes the carbon fibers throughout the fabric.

In order to weave the polar woven fabric, the length and tension on each end yarn may be individually controlled so that the yarns are not warped and the desired inner diameter and outer diameter of the helical fabric may be produced. The remainder of the weaving sequence is conventional except for the carbon yarns being used. For this polar weaving, a conventional weaving loom may be suitable.

The fabric dimensions, characteristics and geometry may be tailored to fulfill the desired composite performance required. The dimensions, characteristics and parameters may be adjusted by using various weave patterns, as described below, or polar woven fabrics with different gradients as described below with references to FIGS. 4–5. The width of the disk produced may be adjusted by adjusting fabric width on the weaving loom which correspond to the preform disk size prior to densification and may be easily adjusted according to disk size. Various weave patterns that may affect the characteristics of the resulting preform and carbon preform will now be described.

FIGS. 3A–3E illustrate various weave patterns that may be utilized to change the characteristics of the polar woven fabric and the resulting preform and part. The weave pattern may also be selected based on the needling parameters, such as needle orientation and needling density. A combination of these parameters with the fabric pattern may result in different properties of the resulting preform and the resulting carbon part. FIG. 3A illustrates a simple, plain, basic weave pattern which is easy to make. FIGS. 3B and 3C illustrates a twill weaving pattern from each side of the fabric. This weaving pattern produces a smoother fabric than the simple weave pattern which may increase the strength of the preform produced, but may be more difficult to manufacture and may increase the overall cost of the preform. FIGS. 3D and 3E illustrate a five harness satin weave for each side of the fabric. The satin weaving pattern produces the smoothest, flattest fabric to produce stronger preforms, but may be more difficult to manufacture and further increases the cost of the preform. The choice between these weaving patterns depends on the particular desired characteristics of the preform. Now, a method for producing a polar woven fabric substrate having a homogeneous structure will be described with reference to FIGS. 4 and 5.

One of the important characteristics of the polar woven fabric and the resulting preform and part is the development of a homogeneous structure throughout the preform. The homogeneous structure may be achieved by the polar woven fabric and by the consolidation of the polar woven substrate due to needling. Polar weaving produces a uniform fiber volume fraction throughout the fabric width (i.e., from inner diameter to outer diameter) which may produce a homogeneous structure, as described below with references to FIGS. 4–5. A conventional polar weave fabric formation method has a non-uniform area density across the width of the fabric, because the density of the carbon yarns decrease toward the outer edge of the disk preform. Now, the formation of the polar woven fabric with homogenous structure will be described. Several different techniques are possible and two will be described below.

Figure 4:
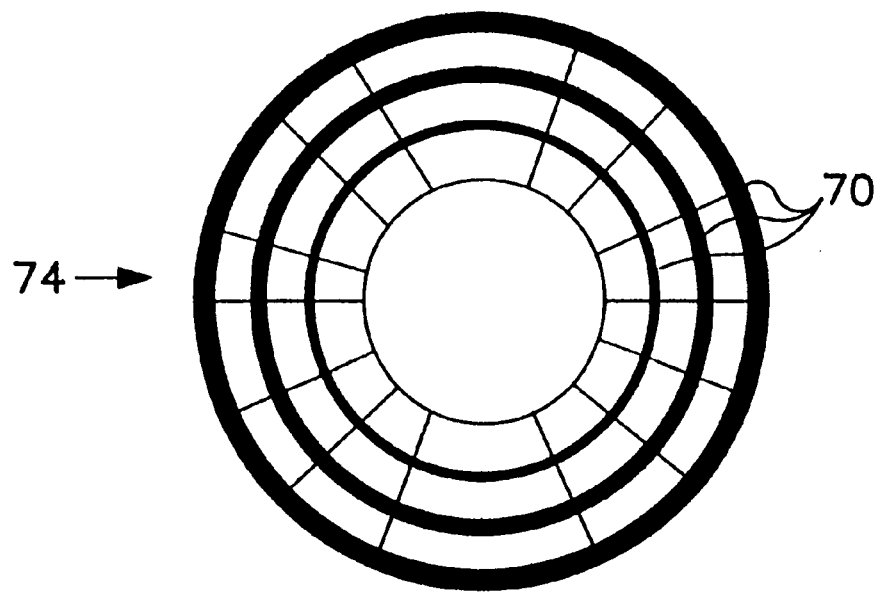
FIG. 4 is a diagram illustrating a polar woven substrate with a warp ends fineness gradient construction that may be used to manufacture a polar woven preform in accordance with the invention.

In one embodiment shown in FIG. 4, the yarn linear density, also known as tex, of the warp yarns 70 within a polar woven fabric 74 may be adjusted to maintain a uniform fiber volume fraction. This is known as a polar woven fabric with warp ends fineness gradient construction. As shown, the size of the warp yarns may increase from the inner diameter of the fabric to the outer diameter of the fabric to maintain a uniform fiber volume fraction. This embodiment may require a tighter control of the yarn thickness. Now, a second embodiment for manufacturing a polar woven fabric with a homogeneous structure will be described.

Figure 5:
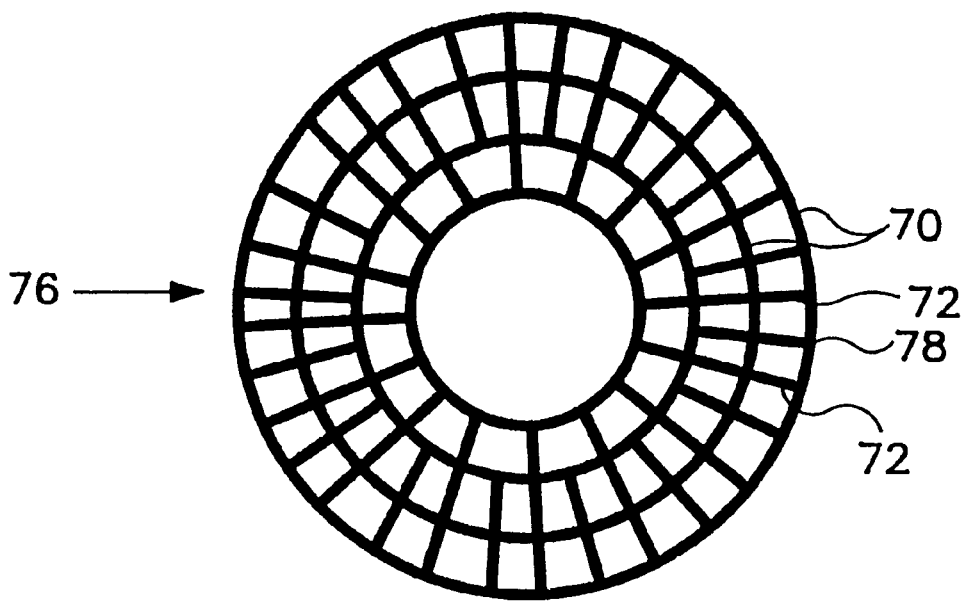
FIG. 5 is a diagram illustrating a polar woven substrate with a pick gradient construction that may be used to manufacture a polar woven preform in accordance with the invention.

FIG. 5 illustrates a polar woven fabric 76 with a pick gradient construction in which the number of pick yarns per square inch (ppi) from inner diameter to outside diameter is increased in order to keep the fabric areal density constant. As shown, toward the outer diameter of the helical fabric, there may be additional pick yarns 78 added into the fabric such that, even at the outer diameters of the fabric, the number of pick yarns per square inch remains relatively constant. Although one additional pick yarn is shown between the pick yarns 72, the invention is not limited to any particular number of additional pick yarns. As an example, the distribution ratio of warp yarns 70 to pick yarns 72 may be maintained at 1:1 throughout the helical fabric. The desired addition of pick yarns may be achieved by dropping an appropriate pick yarn into the appropriate part of the fabric. In addition, pick yarns of different lengths may also be inserted into the fabric. This pick gradient construction may also be combined with the method described above if desired. Now, a method for consolidating the polar woven fabric into a carbon preform in accordance with the invention will be described.

Figure 6:
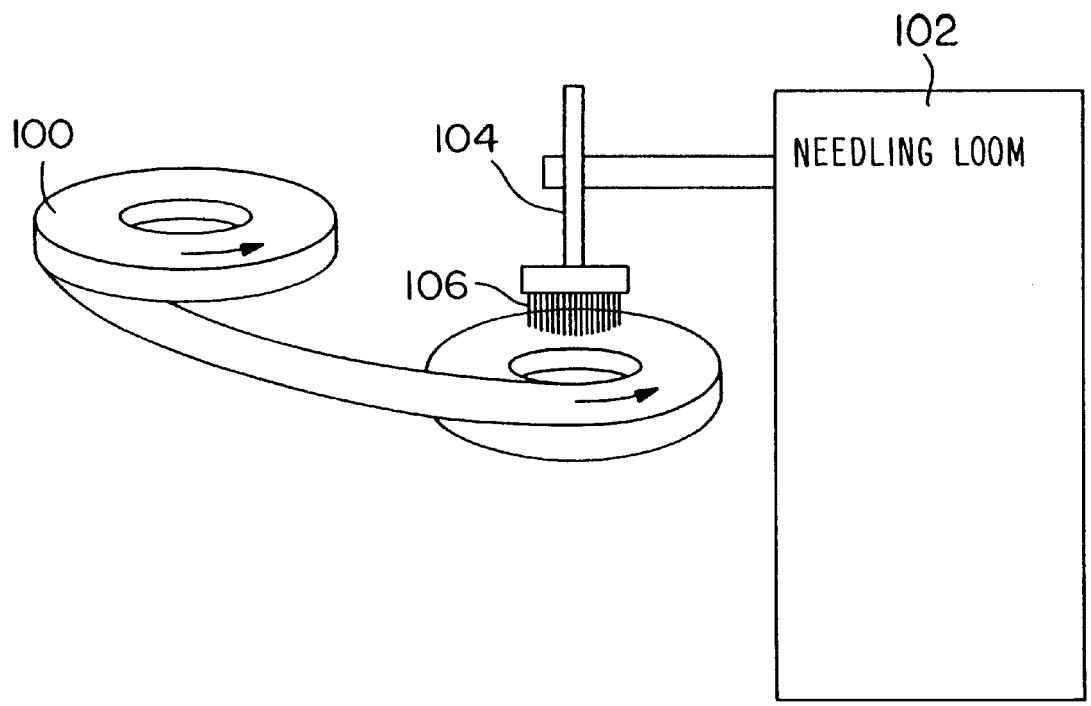
FIG. 6 is a diagram illustrating a method for consolidating a polar weave fabric substrate to form a preform in accordance with the invention.
Figure 7:
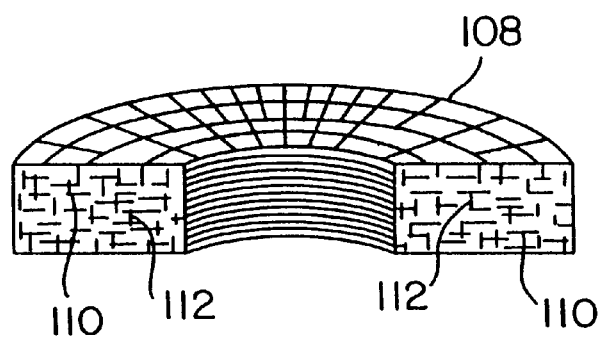
FIG. 7 is a cross-sectional view of a consolidated preform in accordance with the invention.

FIG. 6 is a diagram illustrating a method for consolidating a polar woven helical fabric into a carbon preform in accordance with the invention and FIG. 7 illustrates a consolidated preform. As shown, the disk preform may be produced by stacking a number of turns of the polar woven helical fabric 100, up to a desired thickness. These layers of fabric may be needle punched by a needling loom 102 with a plurality of needles 106. The process for consolidating the preform (i.e., the needling) may occur in several ways. In particular, the polar woven fabric may be provided to the needling loom discontinuously so that each turn of fabric is separate, or the polar woven fabric may be continuously supplied to the needling loom which increases the speed of the needling process. In addition, each turn of the fabric may be needled, several turns of the fabric may be needled at once, or all of the turns may be needled at the same time.

In one embodiment, discontinuous turns of polar woven fabric may be supplied to the needling loom so that a first and second turn of fabric may be needled and then each additional turn/layer may also be needled. In addition, the entire preform may also be needled on or more times after no additional layers are added to the preform. The needling may bond the layers of the polar woven helical fabric together because, during needling, as is known in the art, some of the fibers in each layer may be reoriented from a particular substrate layer through to another substrate layer so that some of the fibers within and between the substrates become oriented in the Z direction and become intermingled with fibers from other layers, which increases the interlaminar strength of the resulting preform.

FIG. 7 illustrates a cross-section of a resulting disk preform 108 which is produced in accordance with the invention and may have a three-dimensional fiber orientation distribution due to the gradient constructions described above, and due to the needling. A plurality of the fibers 110 within the disk preform may be mostly oriented in a plane perpendicular to the disk axis, lying circumferentially and radially to the axis. A comparatively small amount of the fibers 112, due to needling, may be oriented along the axis. The orientation of the fibers in the disk preform may be adjusted depending on the desired characteristics of the finished carbon part. For example, the carbon fibers oriented in the radial and circumferential directions may be adjusted using the techniques described above with reference to FIGS. 4–5. A plurality of layers of the polar woven fabric may also be pre-needled, stacked on top of each other and needled again to further consolidate the preform. For thin individual layers of polar woven fabric, several layers may be stacked on top of each other and needled.

In a second embodiment, to improve the production rate of the near netshape preforms from the needler, the disk preforms may be manufactured in a continuous process where the polar woven fabric may be fed continuously, turn after turn, to a needling loom. First, a single layer corresponding to one turn of the polar woven fabric may be placed in a receiving bowl in the needling loom and a second layer may be stacked on top of the first layer and needled to the first layer. Next, a third layer may be stacked on top of the first two layers and the third layer may be needled punched into the first two layers and so on until the desired preform thickness is obtained. The penetration depth of the needles during the needling may be kept substantially at every added layer after the third layer so that the uniform distribution of the carbon fibers through the thickness of the preform is increased. One or more finishing needling runs may also be performed once no additional layers are being added to the preform in order to maintain uniform fiber distribution in the preform.

To manufacture a near netshape preform with the desired characteristics, the appropriate needling parameters may be selected. The needling parameters that may be adjusted may include, for example, the selection of the particular type of needle, the needling density per run which is a function of the number of strokes per minute of the needling loom, the rate of the fabric advance into and out of the needling loom, the number of needles in the needling loom, and the needle density gradient of the needle board. Another adjustable parameter is the needle penetration depth. The needling density may vary between about 5 needle punches per $cm^2$ to about 500 needle punches per $cm^2$. An excessive amount of needling may destroy the carbon fibers while too little needling may not sufficiently strengthen the preform. The needle penetration depth is measured from the top of the preform to the tip of the needle and may range from zero millimeters (mm) to 20 mm depending on the thickness of the preform and the desired needling density. The changes is these various needling characteristics affect the integrity of the preform because more needling may increase the number of carbon fibers reoriented in the Z direction which increases the cohesion of the preform. The near netshape carbon preform may have a fiber fraction volume that may range from about 23 percent of the preform to about 33 percent of the preform. However, lower and higher values are achievable. It should also be noted that various quantities of Z fibers from the inner diameter to the outer diameter may be tailored through the proper selection of needle type, needle density and needle penetration.

An illustrative example of a polar woven fabric and a preform produced in accordance with the invention will be described. The illustrative preform is about three quarters of an inch (0.75") thick and may be used for an aircraft brake requiring high temperature characteristics. A 12,000 filament carbon yarn may be used and these yarns may be used to produce a polar woven fabric. The polar woven fabric may have a plain weave pattern to provide balance to the structure and to facilitate needling. The fabric may also have a pick gradient for uniform fiber distribution in the fabric. The fabric areal density is about 600 grams per $m^2$. To produce the desired 0.75" thick preform, tens turns of fabric are used. The preform may be formed by needling the first two layers of the fabric together and then needling each successive added layer onto the substrate. For this particular preform, a needling density of 15 punches per $cm^2$ per needling run was used and a needle penetration depth of 17 mm was used. These parameters were selected to provide uniform preform integrity and sufficient bonding between the layers. The resulting preform may have a near net shape and a homogeneous fiber volume fraction throughout its width and thickness. In this example, the fiber volume fraction is about 27 percent of the total volume of the preform.

While the foregoing has been with reference to particular embodiments of the invention, it will be appreciated by those skilled in the art that changes in these embodiments may be made without departing from the principles and spirit of the invention, the scope of which is defined by the appended claims.

We claim:

1. A needled near netshape carbon preform, comprising a polar woven fabric of a plurality of carbon yarns, said polar woven fabric having a helical shape and an adjustable fiber orientation distribution, said polar woven fabric being laid down, turn by turn, into a near net shape preform, and each layer of said polar woven fabric being needled to produce a near net shape preform with increased interlaminar strength and an adjustable fiber orientation distribution.

2. The preform of claim 1, wherein said helical shape fabric is manufactured by a pair of rollers through which the fabric passes, the pair of rollers being conical shaped rollers such that an inner diameter and an outer diameter of the fabric is different.

3. The preform of claim 1, wherein said fabric comprises a plain weave pattern.

4. The preform of claim 1, wherein said fabric comprises a twill weave pattern.

5. The preform of claim 1, wherein said fabric comprises a satin weave pattern.

6. The preform of claim 1, wherein each carbon yarn comprises a continuous carbon filament.

7. The preform of claim 1, wherein each carbon yarn comprises a plurality of discontinuous carbon filaments and a fugitive material wrapped around said discontinuous carbon filaments.

8. The preform of claim 1, wherein said fabric comprises a gradient across the width of the fabric and said gradient comprises increasing the size of yarns from the inner diameter to the outer diameter of the preform.

9. The preform of claim 1, wherein said fabric comprises a plurality of warp yarns perpendicularly oriented with respect to a plurality of pick yarns and wherein said fabric further comprises a gradient across the width of the fabric, the gradient comprising increasing the number of pick yarns from the inner diameter to the outer diameter of the preform.

10. The preform of claim 1, wherein said needling comprises means for penetrating each layer of the preform to a substantially constant depth.

11. A method for manufacturing a near netshape carbon preform, comprising:

provide a polar woven fabric having a plurality of carbon yarns, the polar woven fabric having a helical shape;

placing a layer of the helical shape fabric on top of a previous helical layer; and needle punching said layer to said previous layer to intermingle the carbon fibers in said layer with the carbon fibers in said previous layer to increase the interlaminar strength of the composite and the integrity of the preform.

12. The method of claim 11 further comprising continuously supplying layers of said fabric to produce a plurality of preforms.

13. The method of claim 11 further comprising manufacturing said helical fabric using a pair of rollers through which the fabric passes, the pair of rollers being conical shaped rollers such that an inner diameter and an outer diameter of the fabric is different.

14. The method of claim 11, wherein said fabric is manufactured with a plain weave.

15. The method of claim 11, wherein said fabric is manufactured with a twill weave pattern.

16. The method of claim 11, wherein said fabric is manufactured with a satin weave pattern.

17. The method of claim 11, wherein providing said polar woven fabric comprises providing a gradient across the width of the fabric, the gradient comprising increasing the number of pick yarns in the fabric.

18. The method of claim 11, wherein providing said polar woven fabric comprises providing a gradient across the width of the fabric, the gradient comprising increasing the size of yarns from the inner diameter to the outer diameter of the preform.

19. The method of claim 11, wherein said fabric comprises a plurality of warp yarns perpendicularly oriented with respect to a plurality of pick yarns at their cross-over point and wherein providing said fabric comprises providing a gradient that increases the number of pick yarns from the inner diameter to the outer diameter of the preform.

20. The method of claim 11, wherein said needling comprises penetrating each layer of the preform to a substantially constant depth.

21. The method of claim 11, wherein said needling further comprises providing a predetermined needling density to said preform.

22. The method of claim 21, wherein said predetermined needling density is between about five needle punches per square centimeter and about five hundred needle punches per square centimeter.

23. The method of claim 11 further comprising needle punching a plurality of layers of fabric together at one time.

* * * * *